(12) United States Patent
Hein

(10) Patent No.: US 6,486,465 B1
(45) Date of Patent: Nov. 26, 2002

(54) METHOD OF DETECTING FLAWS IN STRUCTURAL MEMBERS

(76) Inventor: Gregory S. Hein, 3819 SW. Thornton, Des Moines, IA (US) 50321

( * ) Notice: Subject to any disclaimer, the term of this patent is extended or adjusted under 35 U.S.C. 154(b) by 73 days.

(21) Appl. No.: 09/685,783

(22) Filed: Oct. 10, 2000

(51) Int. Cl.[7] .................................................. G02B 6/00
(52) U.S. Cl. ............................ 250/227.14; 250/227.16; 385/12
(58) Field of Search ........................ 250/227.11, 227.14, 250/227.15, 227.16, 227.21, 227.28; 385/12, 13

(56) References Cited

U.S. PATENT DOCUMENTS

| | | | |
|---|---|---|---|
| 3,910,105 A | 10/1975 | Hoffstedt | 73/88 A |
| 4,772,092 A | 9/1988 | Hofer et al. | 250/96 |
| 4,836,030 A | 6/1989 | Martin | 73/800 |
| 4,983,034 A | 1/1991 | Spillman, Jr. | 356/32 |
| 5,567,932 A * | 10/1996 | Staller et al. | 250/227.14 |
| 5,609,952 A | 3/1997 | Weiss | 428/298 |
| 6,047,094 A | 4/2000 | Kalamkarov et al. | 385/12 |

\* cited by examiner

*Primary Examiner*—Kevin Pyo

(57) ABSTRACT

A method for detecting structural flaws in a structural member that includes plastic composite matrix material involves taking a quantity of matrix material that is substantially free of any non-optic glass fibers, molding the matrix material into a structural loadbearing member having a length and opposite end surfaces, placing a plurality of straight continuous spaced elongated fiber optic strands having the same length as the loadbearing member in the matrix material before molding, loading the structural member to exert stress and strain thereon, exposing one of the ends of the fiber optic strands to a source of light, viewing the opposite ends of the fiber optic strands to determine if light is being emitted therefrom by passing through the fiber optic strands, and making an evaluation of any structural flaws in the member by determining whether light from the light source has been fully transmitted through the fiber optic strands.

6 Claims, 2 Drawing Sheets

METHOD OF DETECTING FLAWS IN STRUCTURAL MEMBERS

BACKGROUND OF THE INVENTION

The present invention relates to the field of use of optical fibers for non-destructive evaluation (NDE) of polymer matrix composite structural members. More particularly, the present invention is a method for detecting flaws in structural members made of polymer matrix composite materials by utilizing optical fibers in the structural composites themselves.

Various polymer resin matrix composite materials are well known in the art. Glass fibers are the most common of all reinforcing fibers for polymer matrix composites. For structural composites, the two commonly used glass fibers are E-glass and S-glass. These glass fibers are primarily composed of a silica ($SiO_2$) backbone in the form of a $SiO^4$ tetrahedra. The silicas are then doped with modifier ions that can contribute to their glass properties and manufacturing capability. However, fiberglass composites have not been able, as of yet, to prove their durability and serviceability. Fiberglass composites need to become more predictable, like steel, in order to be used extensively with a high degree of confidence in their structural integrity. Therefore, there is a need for a method for detecting flaws in the composite polymer matrix structural members.

A primary objective of the present invention is the provision of a method of detecting flaws in structural members.

Another objective of the present invention is the provision of a method of detecting flaws in structural members that involves the integration of optical fibers into the composite matrix to the substantial exclusion of traditional glass fibers.

Another objective of the present invention is to more easily permit non-destructive evaluation of structural members.

Another objective of the present invention is the provision of a method of detecting flaws in structural members that permits an onlooker or investigator to easily evaluate the integrity of the entire composite structural member.

Another objective of the present invention is the provision of a method of detecting flaws in structural members that is reliable and inexpensive to use.

These and other objectives will become apparent to one skilled in the art in view of the drawings, as well as the description and claims that follow.

SUMMARY OF THE INVENTION

The present invention relates to a method for detecting flaws in structural members made of polymer matrix composite materials by utilizing optic fibers and preferably only optic fibers, in the structural composites. The method includes taking a quantity of polymer matrix material that is substantially free of any non-optic glass fibers, molding the matrix material into a structural loadbearing member having a length and opposite ends surfaces, placing a plurality of continuous individual straight elongated fiber optic strands having the same length as the loadbearing member in the matrix material before molding, loading the structural member to exert stress and strain thereon, exposing one of the ends of the fiber optic strands to a source of light, viewing the opposite ends of the fiber optic strands to determine if light is being emitted therefrom by passing through the fiber optic strands, and making an evaluation of any structural flaws in the member by determining whether light from the light source has been fully transmitted through the fiber optic strands.

DETAILED DESCRIPTION OF THE PREFERRED EMBODIMENT

Figure 1:
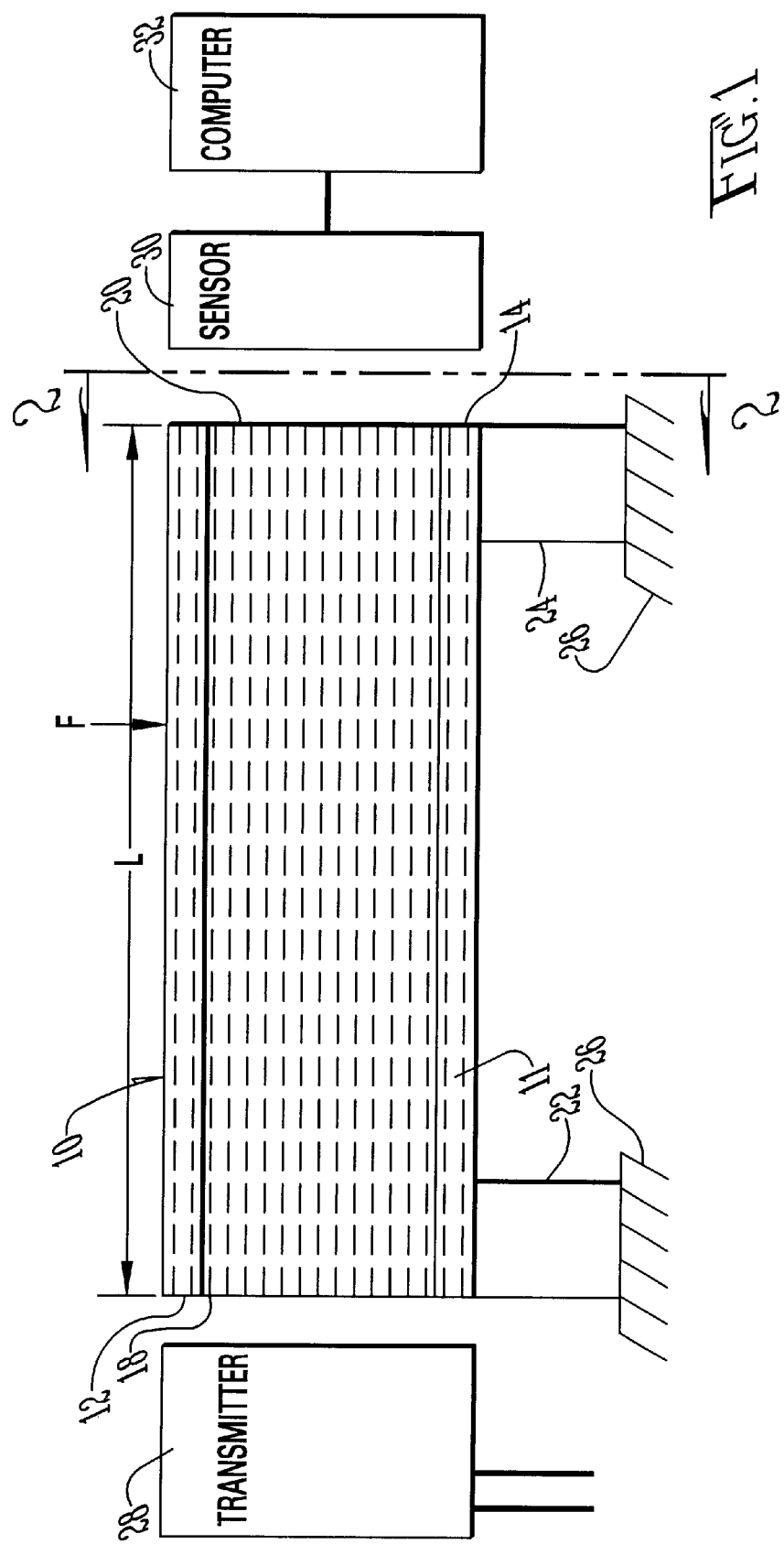
FIG. 1 is a schematic diagram illustrating the method of the present invention for detecting flaws in structural members.
Figure 2:
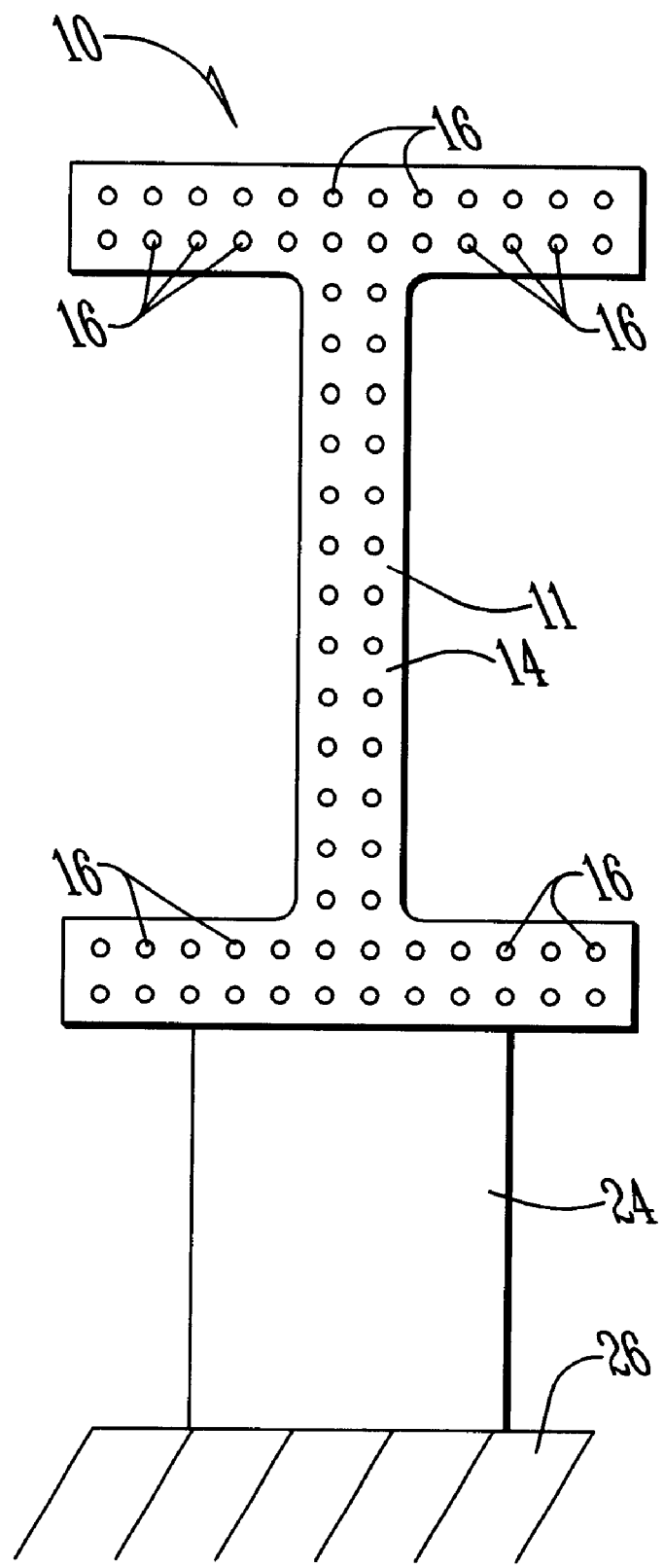
FIG. 2 is an end elevation view taken along line 2—2 in FIG. 1 of the structural member for this invention.

In FIGS. 1 and 2, the polymer resin matrix composite material loadbearing structural member for practicing this invention is designated by the reference numeral 10. The structural member 10 is formed by conventional bulk molding techniques, which involve taking a quantity of polymer matrix material free of any non-optic glass fibers and molding the matrix material into a structural loadbearing member having a longitudinal length L and exposed opposite end surfaces 12, 14. Before the matrix material 11 is placed into the mold, a plurality of continuous elongated straight individually spaced fiber optic strands 16, having opposite ends 18, 20 located on the opposite end surfaces 12, 14, are placed in the matrix material. Although the molded structural member 10 is an I-shaped beam in FIG. 2, other shapes are possible without detracting from the present invention. The strands 16 are individually separated and are not arranged in bundles.

The matrix material 11 is preferably a conventional polyester or vinyl ester material for ease of molding. The fiber optic strands are available from LUCENT Technologies of Wheaton, Ill. The optical fiber strands 16 have an average tensile strength similar to E-glass and S-glass or in the range of 2 GPa to 5 GPa. The optical fibers are a purer silica ($SiO_2$) doped with germanium to enhance the optical properties. Flourides are also used to improve the optical quality of the fibers.

To detect structural flaws in the polymer matrix material of the molded structural member 10, the structural member 10 is placed in a loadbearing arrangement, such as that shown in FIG. 1. The structural member 10 is supported at opposite ends by intermediate support members 22, 24 that rest on a fixed supporting surface 26. A light emitting transmitter 28 is placed adjacent the end surface 12 of the structural member 10. In this position, the transmitter 28 directs light toward the end 18 of each of the fiber optic strands 16 that are imbedded in the material. A light sensor or receiver 30 is located adjacent the other end surface 14 of the structural member 10 and is directed at the ends 20 of the fiber optic strands 16. Preferably, the transmitter 28 and the receiver 30 are of sufficient size and are properly focused to cover the entire end surfaces 12, 14 of the structural member 10. The receiver 30 is electrically connected to or in communication with a computer 32 that can be programmed to evaluate any structural flaws in the structural member 10 by determining whether light from the light source or transmitter 28 has been fully transmitted through the fiber optic strands 16 when the structural member 10 is loaded with a force F to exert stresses and strains thereon.

The computer can greatly assist in the evaluating the structural flaws in the structural member 10. The percentage of failed fiber optic strands can be readily determined by totaling the number of fiber optic strands through which the light source is not fully transmitted, then dividing this number by the total number of fiber optic strands in the structural member 10.

The structural member 10 can also be evaluated in a destructive manner wherein the loading step is continued with progressively higher loads until the structural member 10 fractures. This allows the evaluator to better understand the fracture pattern of the matrix material.

The present invention provides a method of detecting structural flaws in polymer matrix material by incorporating therein preferably only optic fiber sensors, to the exclusion of conventional glass fibers. If some conventional glass fibers are included, they should not comprise more than 40% of the total number of optic fibers and glass fibers. Further, as previously indicated, the optic fibers should be longitudinally straight and individually positioned and spaced from each other as distinguished from being arranged in bundles. Therefore, it can be seen that the present invention at least satisfies its stated objectives.

The preferred embodiment of the present invention has been set forth in the drawings and specification, and although specific terms are employed, these are used in a generic or descriptive sense only and are not used for purposes of limitation. Changes in the form and proportion of parts as well as in the substitution of equivalents are contemplated as circumstances may suggest or render expedient without departing from the spirit and scope of the invention as further defined in the following claims.

What is claimed is:

1. A method for detecting structural flaws in a structural member including a polymer composite matrix material, comprising, taking a quantity of polymer matrix material free of any non-optic glass fibers, molding the matrix material into a structural loadbearing member having a longitudinal length and exposed opposite end surfaces, placing in the matrix material before the molding only a plurality of continuous elongated fiber optic strands having opposite ends located on the opposite end surfaces, respectively, of the structural member, loading the structural member to exert forces of stress and strain thereon, exposing one of the ends of the fiber optic strands to a source of light, viewing the opposite ends of the fiber optic strands to determine if light is being emitted therefrom from the source of light passing through the fiber optic strands, and making an evaluation of any structural flaws in the structural member by determining whether light from the light source is not fully transmitted through the fiber optic strands from one end thereof to the other.

2. The method of claim 1 wherein the fiber optic strands are individually spaced from each other.

3. The method of claim 1 wherein the fiber optic strands are longitudinally straight.

4. The method of claim 2 wherein the fiber optic strands are longitudinally straight.

5. A method for detecting structural flaws in a structural member including a polymer composite matrix material, comprising, taking a quantity of polymer matrix material free of any non-optic glass fibers, molding the matrix material into a structural loadbearing member having a longitudinal length and exposed opposite end surfaces, placing in the matrix material before the molding a plurality of continuous elongated longitudinally straight fiber optic strands having opposite ends located on the opposite end surfaces, respectively, of the structural member, loading the structural member to exert forces of stress and strain thereon, exposing one of the ends of the fiber optic strands to a source of light, viewing the opposite ends of the fiber optic strands to determine if light is being emitted therefrom from the source of light passing through the fiber optic strands, and making an evaluation of any structural flaws in the structural member by determining whether light from the light source is not fully transmitted through the fiber optic strands from one end thereof to the other.

6. A method for detecting structural flaws in a structural member including a polymer composite matrix material, comprising, taking a quantity of polymer matrix material free of any non-optic glass fibers, molding the matrix material into a structural loadbearing member having a longitudinal length and exposed opposite end surfaces, placing in the matrix material before the molding a plurality of continuous elongated individually spaced fiber optic strands having opposite ends located on the opposite end surfaces, respectively, of the structural member, loading the structural member to exert forces of stress and strain thereon, exposing one of the ends of the fiber optic strands to a source of light, viewing the opposite ends of the fiber optic strands to determine if light is being emitted therefrom from the source of light passing through the fiber optic strands, and making an evaluation of any structural flaws in the structural member by determining whether light from the light source is not fully transmitted through the fiber optic strands from one end thereof to the other.

* * * * *